March 13, 1934. G. A. RAGUIN 1,950,863

INDIVIDUAL ENVELOPE FOR PHOTOGRAPHIC FILMS

Filed April 13, 1931

INVENTOR.
GEORGES ANDRÉ RAGUIN.
ATTORNEY.

Patented Mar. 13, 1934

1,950,863

UNITED STATES PATENT OFFICE 1,950,863

INDIVIDUAL ENVELOPE FOR PHOTOGRAPHIC FILMS

Georges André Raguin, Lyon, France, assignor to Société Lumiere, Paris, France, a French company Application April 13, 1931, Serial No. 529,823
In France January 29, 1931

5 Claims. (Cl. 95—72)

This invention relates to an individual envelope for each film of a series of photographic films intented to be used in photographic plate-carrying frames.

Usually a plurality of such films are marketed wrapped together in a package which must be unfolded in the dark when the user wants but one film, and it must be re-folded to protect the remaining films from daylight. The film is difficult to insert into the film holder. The operator must ascertain the face to be disposed in contact with the back of the holder (which face is the sensitized one in colour-films by the autochrome process), and he has to insert the film without scratching the same.

These operations are rendered greatly easier by the invention. According to the latter, each film is wrapped in an individual envelope which permits of ascertaining the face to be disposed against the film-holder back and which protects this face from scratches.

Figure 1:
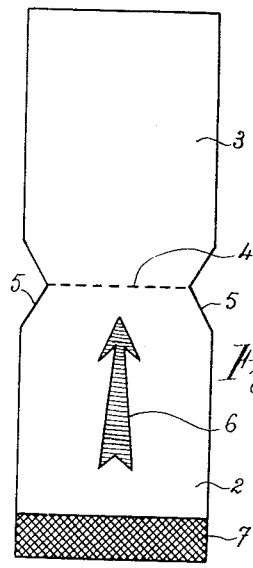
Fig. 1 is a plan view of an individual envelope in the unfolded state.
Figure 2:
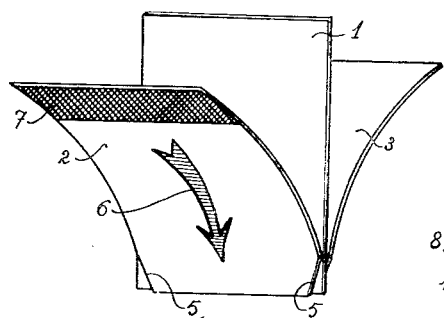
Fig. 2 shows a film in its individual envelope.

The film 1, of rectangular or square shape, is inserted between the two faces 2 and 3 of an envelope. The latter is a mere sheet of paper, as wide as the film and twice as long, folded midway of its length as shown at 4 (Fig. 1). Two side notches 5 are provided at the fold 4 and, when folded, the envelope thus presents two cut-out angles through which the angles of the film project (Fig. 2).

Face 2 is provided with marks for the sight and the touch. In the example illustrated, an arrow 6 is printed on the face (in red with black background) and the upper edge 7 is embossed so as to present a wrinkled surface.

The envelope may be glued to the lower edge of the film.

When the film is to be inserted into the film holder, the operator ascertains face 2 either by arrow 6 (if he operates in the red light) or by edge 7 (if he operates in the dark). This face corresponds to the front face of the film.

Figure 3:
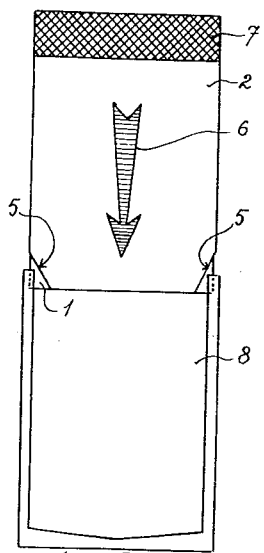
Fig. 3 shows the film partially inserted into the film holder.

The operator then inserts the film with its envelope into the film holder, arrow 6 pointing towards the holder and edge 7 being remote from the latter (Fig. 3).

Figure 4:
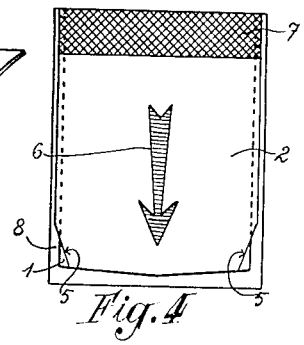
Fig. 4 shows the film wholly inserted into the film holder.
Figure 5:
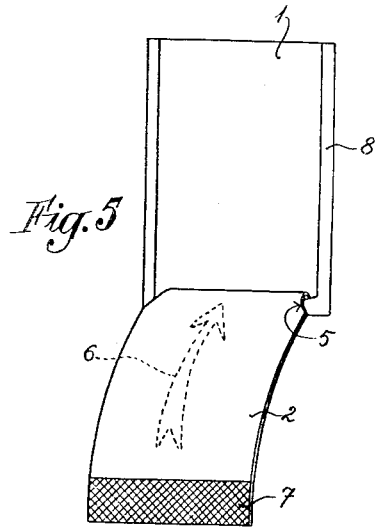
Fig. 5 shows the loaded film-holder during the back-folding of the front face of the individual envelope.
Figure 6:
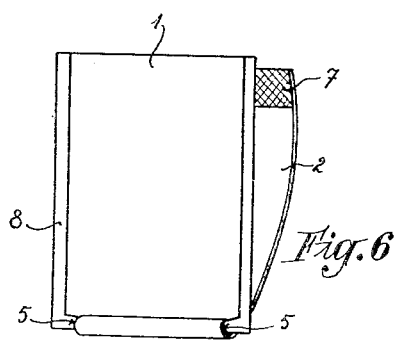
Fig. 6 shows the film holder with its film, ready to be inserted into the plate carrying frame.

Under these conditions, the two lower angles of the film, projecting from the envelope, are very easily inserted into the holder. The back face 3 of the envelope is also inserted into the film holder behind the film. But the front face 2 tends to escape from the film holder and remains in front of the same when the insertion is completed (Fig. 4). This face 2 may then be torn off or folded back behind the film holder as shown, Figs. 5 and 6.

The film holder is thus loaded and ready to be inserted into a photographic plate frame of standard construction. It may be pointed out that with colour films according to the autochrome process, the sensitized face of the film, which is the back face, is protected from the film holder by the face 3 of the envelope. The risk of scratches or other damages is thus minimized.

I claim:

1. An individual envelope for photographic films intended to be used in photographic plate-carrying frames with an intermediate film holder, said envelope being in the form of a sheet of paper substantially rectangular in shape, substantially as wide as the film and substantially twice as long, said sheet being folded about midway of its length, one of the faces of said sheet being exteriorly provided with marks.

2. An envelope as claimed in claim 1, wherein the marks comprise signs adapted to be apparent in red light.

3. An envelope as claimed in claim 1 wherein the marks are adapted to be ascertained by touch.

4. An envelope as claimed in claim 1 wherein the marks comprise an embossed portion on the paper.

5. An individual envelope as claimed in claim 1, wherein the angles adjacent to the fold are cut out so that the angles of the film within said envelope, project from the same.

GEORGES ANDRÉ RAGUIN.